(12) United States Patent
Tan et al.

(10) Patent No.: US 8,908,008 B2
(45) Date of Patent: *Dec. 9, 2014

(54) METHODS AND SYSTEMS FOR ESTABLISHING EYE CONTACT AND ACCURATE GAZE IN REMOTE COLLABORATION

(75) Inventors: Kar-Han Tan, Sunnyvale, CA (US); Ian N. Robinson, Pebble Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/806,531

(22) PCT Filed: Jul. 16, 2010

(86) PCT No.: PCT/US2010/042305
§ 371 (c)(1),
(2), (4) Date: Dec. 21, 2012

(87) PCT Pub. No.: WO2012/008972
PCT Pub. Date: Jan. 19, 2012

(65) Prior Publication Data
US 2013/0093838 A1 Apr. 18, 2013

(51) Int. Cl.
*H04N 7/14* (2006.01)
*H04N 7/15* (2006.01)
*H04N 9/31* (2006.01)

(52) U.S. Cl.
CPC ............... *H04N 7/144* (2013.01); *H04N 7/15* (2013.01); *H04N 9/3179* (2013.01)
USPC .................. 348/14.16; 348/14.01; 348/14.07; 348/14.08; 348/373

(58) Field of Classification Search
CPC ........ H04N 7/142; H04N 7/144; H04N 7/147; H04N 7/15; H04M 3/567
USPC .............. 348/14.01, 14.07, 14.08, 14.06, 373
See application file for complete search history.

(56) References Cited

U.S. PATENT DOCUMENTS

| 5,117,285 | A | * | 5/1992 | Nelson et al. | 348/14.16 |
| 5,666,155 | A | * | 9/1997 | Mersereau | 348/14.16 |
| 5,675,376 | A | * | 10/1997 | Andersson et al. | 348/14.16 |
| 6,882,358 | B1 | * | 4/2005 | Schuster et al. | 348/14.16 |

(Continued)

FOREIGN PATENT DOCUMENTS

WO    WO-94-30016 A1    12/1994

OTHER PUBLICATIONS

International Search Report and Written Opinion of the International Searching Authority, mailed Mar. 30, 2011, issued in related PCT Application No. PCTIUS2010/042305.

*Primary Examiner* — Gerald Gauthier
(74) *Attorney, Agent, or Firm* — Olympic Patent Works, PLLC.; Robert W. Bergstrom

(57) ABSTRACT

In one aspect, a method includes capturing images of a first participant through a display using a camera. The display is located between the first participant and the camera. A video stream of images of a second participant is also received. The images of the second participant are shifted in accordance with a shift vector. The shift vector places the images of the second participant's face in approximate alignment with the eyes of the first participant and the lens of the camera. The shifted images are projected on the display using a projector.

15 Claims, 12 Drawing Sheets

(56) References Cited

U.S. PATENT DOCUMENTS

| | | | |
|---|---|---|---|
| 6,943,843 B2* | 9/2005 | Boyden et al. | 348/373 |
| 8,253,776 B2* | 8/2012 | Chen et al. | 348/14.16 |
| 8,355,038 B2* | 1/2013 | Robinson et al. | 348/14.01 |
| 8,379,075 B2* | 2/2013 | Hagen | 348/14.08 |
| 8,384,760 B2* | 2/2013 | Tan | 348/14.16 |
| 8,427,523 B2* | 4/2013 | Harrell et al. | 348/14.08 |
| 8,514,260 B2* | 8/2013 | Large et al. | 348/14.01 |
| 2004/0189794 A1* | 9/2004 | Rambo et al. | 348/14.16 |
| 2005/0024484 A1* | 2/2005 | Leonard et al. | 348/14.01 |
| 2007/0002130 A1* | 1/2007 | Hartkop | 348/14.16 |
| 2009/0278913 A1* | 11/2009 | Rosenfeld et al. | 348/14.16 |
| 2011/0102538 A1* | 5/2011 | Tan | 348/14.08 |
| 2012/0274727 A1* | 11/2012 | Robinson et al. | 348/14.07 |
| 2013/0093838 A1* | 4/2013 | Tan et al. | 348/14.16 |

* cited by examiner

METHODS AND SYSTEMS FOR ESTABLISHING EYE CONTACT AND ACCURATE GAZE IN REMOTE COLLABORATION

TECHNICAL FIELD

Embodiments of the present invention relate to video-conferencing technology.

BACKGROUND

In recent years, individuals and businesses have begun using video-conferencing technologies to increase efficiency and productivity. In particular, video-conferencing technologies allow people at a first location to simultaneously converse with people at other locations in nearly real time, without wearing facesets or using handheld communication devices. Video conferencing can be as simple as a conversation between two people in different locations point-to-point) or involve several locations (multi-point) with more than one person at each location. Video-conference communication is becoming more affordable to a wide range of users including individuals and businesses, because high-speed Internet connectivity has become more widely available at a reasonable cost, and because the hardware used for this technology has continued to improve in quality at ever lower costs. Carefully designed video-conferencing rooms with large displays can be used to present the video-conference participants with approximately the same size as they would appear if they were in the same room.

However, many video-conferencing technology users argue that a number of issues prevent current video-conferencing technology from becoming a standard part of communication. One major issue is lack of eye contact, which plays a major role in conversational communications, perceived attention and intent, and other important aspects of natural face-to-face communication. For example, consider a first person and a second person participating in a video conference. When the first person looks at a display screen of the second person, the first person is not looking at the camera, resulting in the second person getting a view of the first person without eye contact. On the other hand, when the first person looks at the camera, the first person at best gets a peripheral view of the second person exhibited on the display. Another major issue is gaze awareness. For example, conveying the focus of a remote user's attention (or lack of attention) with regard to shared content, such as a shared document, is an important part of establishing the intersubjectivity required for effective communication. Typically, shared content is displayed separately from the user's displays and the gaze direction is rarely conveyed correctly at each location. Thus, typical video-conferencing technologies are arguably worse than traditional audio conferencing technologies that provide no eye contact cues, because typical video-conferencing technologies create the false impression that participants are either avoiding eye contact or are distracted.

Designers and users of video-conference technologies continue to seek improvements to the video-conferencing experience.

DETAILED DESCRIPTION

Figure 1:
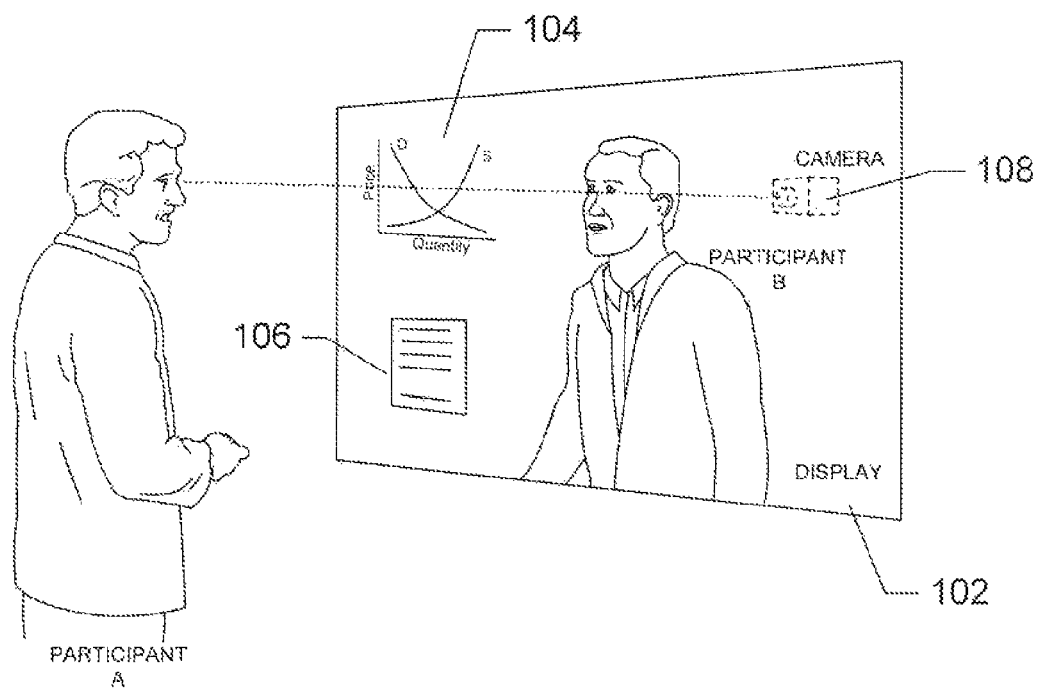
FIG. 1 shows an example of two video-conferencing participants interacting in accordance with embodiments of the present invention.

Various embodiments of the present invention are directed to video-conferencing systems that create eye contact and accurate gaze awareness between video-conferencing participants. FIG. 1 shows an example of two video-conferencing participants interacting in accordance with embodiments of the present invention. In the example shown in FIG. 1, a large display 102 enables a participant A to interact with a remotely located participant B. The participant B can be presented on the display 102 to appear substantially life size to participant A. The display 102 can also be used to present shared content such as a graph 104 and a document 106. The shared content can be presented at participant A and B's separate sites with the correct orientation. A camera 108 is positioned behind the display 102 at approximately eye level to participant A, and the display 102 enables the camera 108 to capture images of participant A through the display 102. The camera 108 can be positioned at a distance from the rear surface of the display 102, so that its viewpoint is roughly equivalent to that of participant B. In order to capture gestures made by participant A with respect to the shared content presented on the display 102, the camera's field of view encompasses approximately the entire display 102. Images of the participants A and B are captured at their respective sites and processed according to embodiments described below so that perceived, eye contact and accurate gaze awareness is created between the participants. For example, as shown in FIG. 1, the image of participant B is projected onto the display 102 so that when participant A looks at the image of participant B's face, participant A looks along a line represented by dashed line 108 that passes approximately between the eyes of participant B's image and into the lens of the camera 108. As a result, participant A perceives eye contact with participant B and by looking into the lens of the camera 108 that same experience can be created for participant B at participant B's remote site.

Figure 2A:
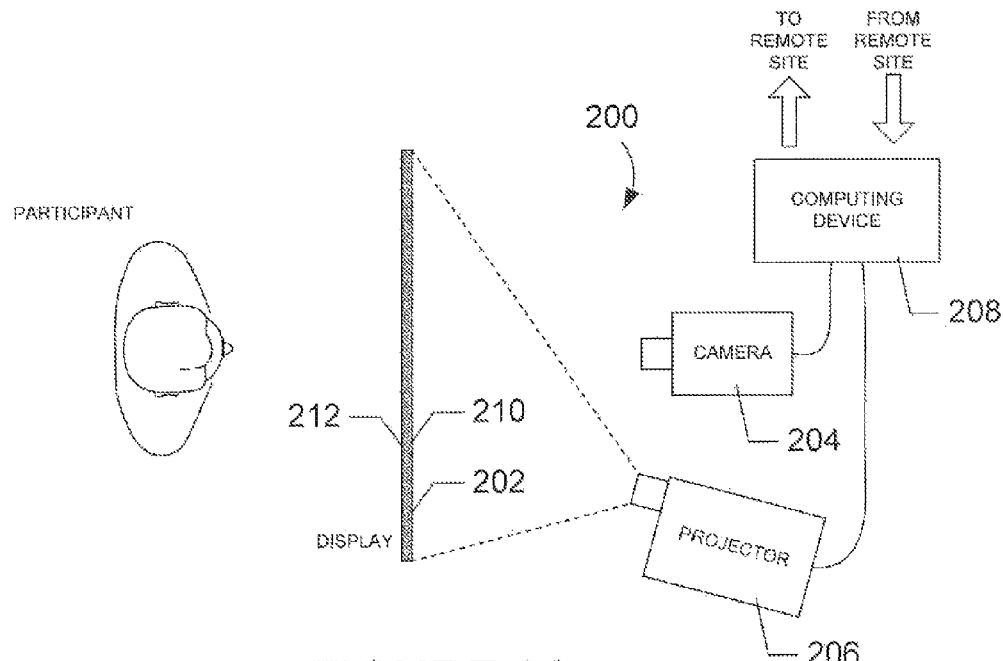
FIGS. 2A-2B each show a different top-plan view and schematic representation of a visual-collaborative system in accordance with embodiments of the present invention.
Figure 2B:
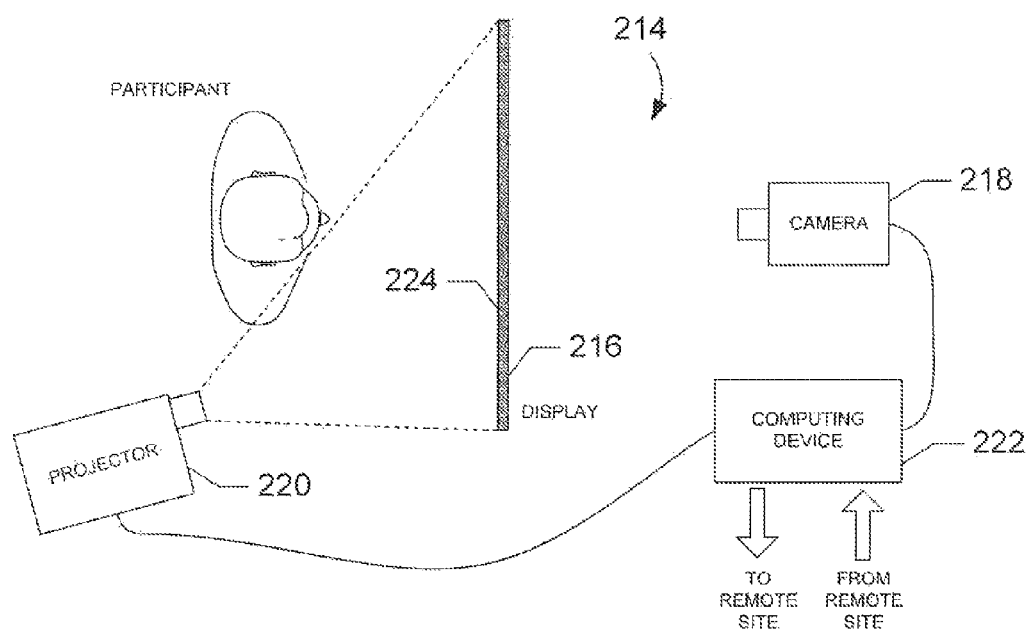

FIGS. 2A-2B each show a top-plan view and schematic representation of a visual-collaborative system. In FIG. 2A, a system 200 includes a display 202, a camera 204, a projector 206, and a computing device 208. As shown in FIG. 2A, the camera 204 and projector 206 are connected to the computing device 208, and the lenses of the camera 204 and the projector 206 are positioned to face a rear surface 210 of the display 20. In the example system 200, the display 202 is a rear projection display screen where the camera 204 captures images through the display 202 and the projector 206 projects images onto the rear surface 210 of the display 202 enabling the images to be viewed by looking at the front surface 212 of the display 202. In FIG. 2B, a system 214 also includes a display 216, a camera 218, a projector 220, and a computing device 222. Like the system 200, the camera 218 and projector 220 are connected to the computing device 222, however, the display 216 is a front projection display screen. In the example system 214, the camera 218 captures images through the display 216 and the projector 220 projects images onto a front surface 224 of the display 216 enabling the images to be viewed by looking at the front surface 224 of the display 216. The cameras 204 and 218 each generate a video stream encoding images captured through the respective screens 202 and 216. The video streams can then be sent over a network, such as the Internet or a local area network, to a remote site for video processing. The computing devices 208 and 220 also receive video streams encoding images captured at a remote site and can process the images captures at the local site and the images received from the remote site.

Figure 3:
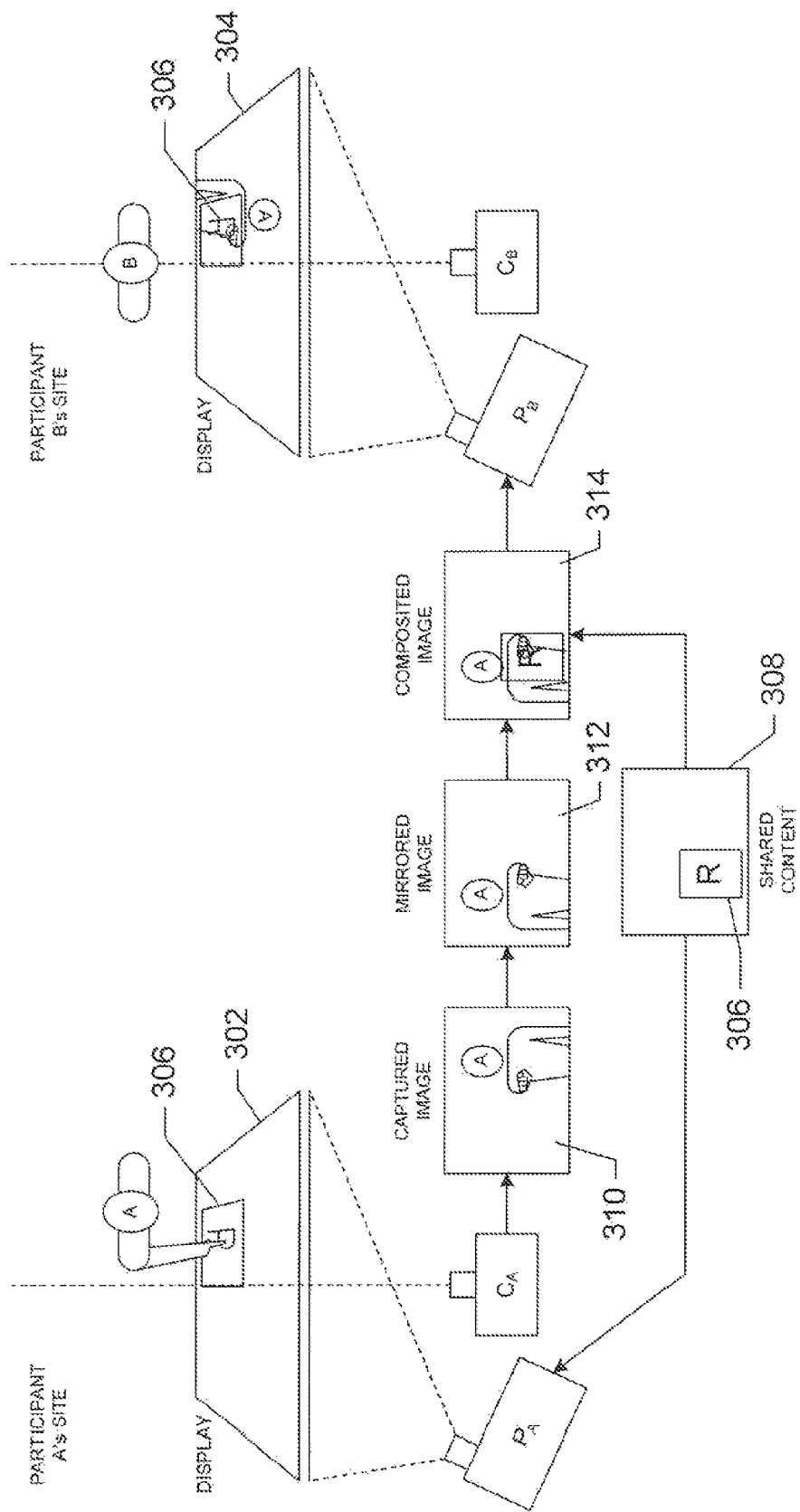
FIG. 3 shows an example of a video conference between two participants.

Displays, such as the displays 200 and 214, allow for capturing an image of a remotely located participant from a viewpoint that corresponds to that of a local participant, as if the participants were co-located on opposite sides of a transparent screen, with the exception of mirroring the images of the participants which may be necessary to keep any shared content intelligible. FIG. 3 shows an example of a video conference between two participants identified as participant A and participant B. Participants A and B are each located at different sites. In the example of FIG. 3, participant A's site includes a rear projection display screen 302, a camera $C_A$, and a projector $P_A$. Participant B's site also includes a rear projection display screen 304, a camera $C_B$, and a projector $P_B$. As shown in FIG. 3, participant A creates shared contend 306 that is projected in the form of an image 308 on the display 302 using the projector $P_A$. Alternatively, the display 302 can be a touch screen or include a touch surface enabling participant A to generate the shared content 306 directly on the display 302, or participant A can create shared content using a diagramming application or a word processing application. Camera $C_A$ captures participant A's image through the display 302 but does not capture any images projected on the screen, such as the shared content, as represented by capture image 310. Image 310 is then mirrored left to right to create image 312. Mirrored image 312 is then composited with shared content image 308 to produce composited image 314 which is projected on the display 304 using the projector $P_B$. As a result, participant B sees the composited mirrored image of participant A with the shared content 306 on the display 304. Although not represented in FIG. 3, an analogous process can be used to capture images of participant B through the display 304, which are processed in the same manner and sent to the projector $P_A$ for presentation on the display 302.

Note that the computing devices not shown in FIG. 3 are used to process the images captured by the respective cameras for projection by the projectors. For example, in certain embodiments, captured images of participant A can be sent from camera $C_A$ to a computing device located at participant A's site which in turn sends the images to a computing device located at participant B's site in the form of a video stream. The computing device located at participant B's site performs the operations of mirroring and composting and presenting the resulting images on the display 304 using the projector $P_B$. In alternative embodiments, the operations of mirroring and composting can be performed by the computing device located at participant A's site and the composited images can be sent to the computing device on participant B's site in the form of a video stream and displayed by the projector $P_B$.

Alternatively, image processing can be carried out at the camera $C_A$ and/or the projector $P_A$. For example, images by the camera $C_A$ can be sent from the camera $C_A$ to the projector $P_B$ over a network located at participant B's site in the form of a video stream. Projector $P_B$ can then perform the operations of mirroring, compositing, and displaying the composited image. As another example, the operations of mirroring and compositing can be performed by the camera $C_A$ and the composited image can be sent to the projector $P_B$ in the form of a video stream and displayed by the projector $P_B$.

Alternatively, the operations of mirroring and compositing can be split between the participant's sites. For example, images captured by the camera $C_A$ can be mirrored by a computing device located at participant A's site or mirrored by the camera $C_A$ and the mirrored images are sent to participant B's site where the mirrored images are composited by a computing device located at participant B's site or are composited by the projector $P_B$.

Video conferencing performed in the manner described above with reference to FIG. 3 recreates a whiteboard-like collaboration experience for the participants, because the participants are not constrained to stand at the center of the display, but instead the participants are free to move about in the area in front of their respective displays and each participant can use the entire display surface for interaction and communicating information. However, this type of interaction may also create problems with establishing eye contact and accurate gaze awareness.

Figure 4:
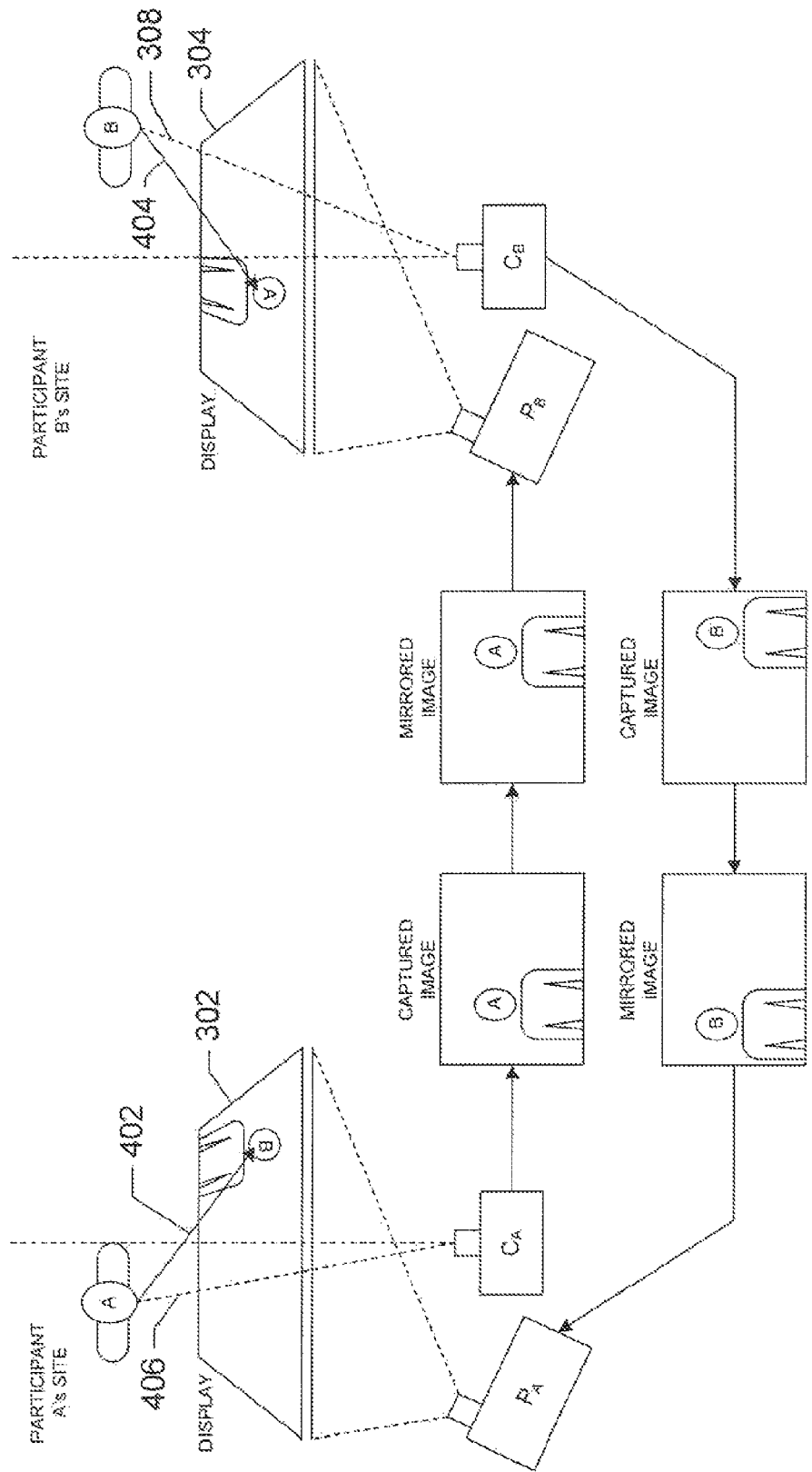
FIG. 4 shows an example top-plan view of a video conference with a gaze problem and failure to establish eye contact.

FIG. 4 shows an example top-plan view of a video conference where gaze awareness and eye contact problems are created by participants not being centered in front of their respective displays. As shown in the example of FIG. 4, camera $C_A$ captures images of participant A through the display 302 at participant A's site. The captured images are mirrored and projected on the display 304 at participant B's site using the projector $P_B$. Likewise camera $C_B$ captures images of participant B through the display 304 at participant B's site. The captured images are also mirrored and projected onto the display 302 at participant A's site using the projector $P_A$. As shown in FIG. 4, participant A is looking directly at participant B's image, as indicated by directional arrow 402, and participant B is looking directly at participant A's image, as indicated by directional arrow 404. However, from camera $C_A$'s viewpoint, participant A appears to be looking to participant A's left, and from camera $C_B$'s viewpoint, participant B appears to be looking to participant B's right. The mirrored image of participant A presented on the display 304 reveals participant A looking to the left, but from where participant B is located, participant B perceives that participant A is not looking directly at participant B. In addition, the mirrored image of participant B presented on the display 302 reveals participant B looking to the right but from where participant A is located, participant A perceives that participant B is also not looking directly at participant A. As a result, neither participant A nor participant B perceives eye contract is established with the other participant.

In order to capture a view of participant A that communicates eye contact with participant B, participant A has to look directly into the lens of camera $C_A$ as indicated by dashed line 406. The image of participant A presented to participant B is then one in which participant A appears to look straight out of the display 304. In general, because the eyes of a static portrait appear to follow the viewer, an effect called the "Mona Lisa Effect," from participant B's point of view, participant A appears to be looking at participant B, irrespective of participant A and B's positions in front of their respective displays. Likewise, in order for participant B to communicate eye contact with participant A, participant B has to look directly into the lens of camera $C_B$ as indicated by dashed line 408. However, as shown in the example of FIG. 4, each participant is presented on the other participant's display such that the participant's attention is drawn away from looking into the lens of the camera.

In order to direct a first participant to look into the lens of a camera located behind a display when attempting to make perceived eye contact with a remotely located second participant, the image of the second participant is shifted to intersect a path or line connecting the first participant's eyes to the lens of the camera. In other words, embodiments of the present invention are directed to shifting the image of the second participant such that the first participant's camera lens, first participant's eyes, and the image of the second participant are aligned.

Figure 5:
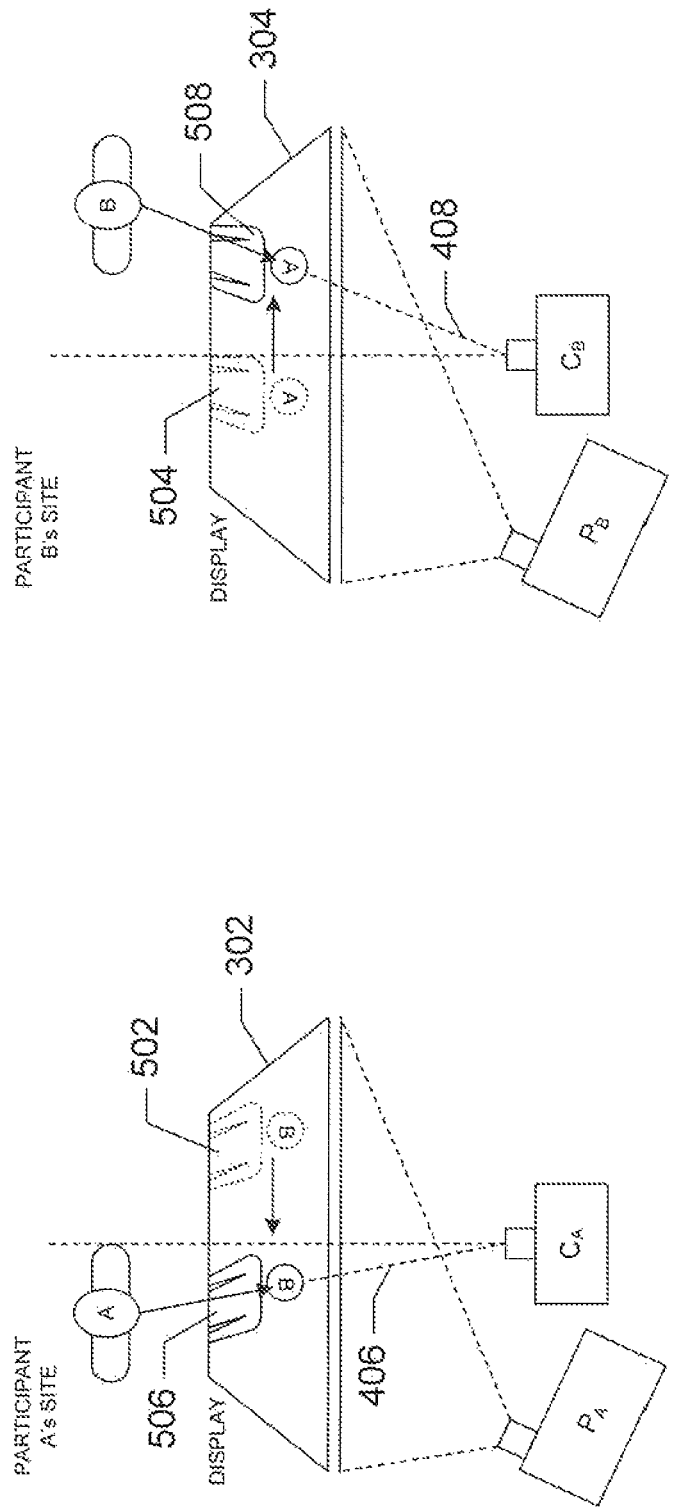
FIG. 5 shows an example top-plan view of establishing eye contact between two participants by shifting the images of the participants in accordance with one or more embodiments of the present invention.

FIG. 5 shows an example top-plan view of establishing eye contact between two participants by shifting the images of the participants. In FIG. 5, dashed-line image 502 of participant B corresponds to the un-shifted location of participant B presented on the display 302 at participant A's site, as shown in FIG. 4. FIG. 5 also includes a dashed-line image 504 of participant A corresponding to the un-shifted location of participant A presented on the display 304 at participant B's site, as shown in FIG. 4. In order to get participant A to look into the lens of camera $C_A$, participant B's image 506 is shifted to intersect the line 406 connecting participant A's eyes to the lens of camera $C_A$. Also, in order to get participant B to look into the lens of camera $C_B$, participant A's image 508 is shifted to intersect the line 408 connecting participant B's eyes to the lens of camera $C_B$. As a result, participant A and participant B each look into their respective cameras and perceive eye contract is established with the other participant.

The amount by which the second participant's image is shifted at the first participant's location to establish perceived eye contact is approximately equal to the difference between the position of the first participant's face in the first participant's captured images and the position of the second participant's face in the second participant's captured images. By symmetry, the amount of shift applied to the two images captured by the separate video-conferencing system is approximately equal and opposite in direction.

Figure 6:
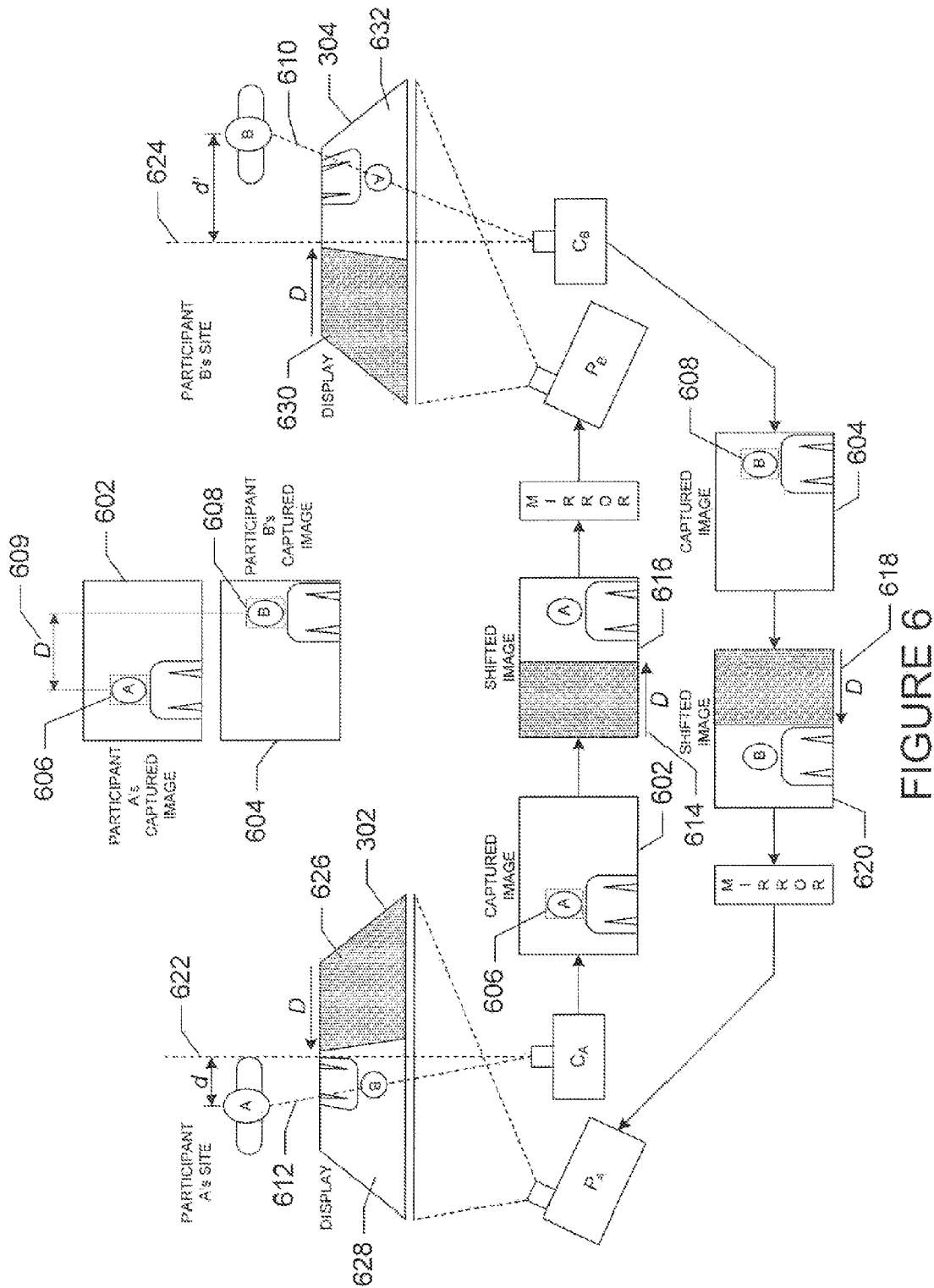
FIG. 6 shows an example top-plan view of shifted images used to establish perceived eye contact between participants in accordance with one embodiment of the present invention.

FIG. 6 shows an example top-plan view of shifted images used to establish perceived eye contact for participants A and H. As shown in FIG. 6, camera $C_A$ captures an image 602 of participant A through the display 302 and camera $C_B$ captures an image 604 of participant B through the display 304. Next, when the cameras $C_A$ and $C_B$ are in the same place with respect the displays 302 and 304, facial recognition can be used to identify the locations of the participant's faces in their respective images and a shift vector can be produced to shift the images to obtain perceived eye contract as follows. In the example of FIG. 6, facial recognition identifies the location of participant A's face, as indicated by box 606, in captured image 602, and facial recognition identifies the location of participant B's face, as indicated by box 608, in captured image 604. The location of participant B's face 608 indicates that the desired position of participant A's image lies along a line 610 connecting participant B's eyes to the lens of camera $C_B$, and the location of participant A's face 606 indicates the desired position of participant B's image lies along a line 612 connecting participant A's eyes to the lens of camera $C_A$. As shown in the example of FIG. 6, this can be accomplished by determining a distance D 609 between the approximate center of the image of participant A's face 606 in captured image 602 and the approximate center of the image of participant B's face 608 in captured image 604. The approximate center of a participant's face can correspond to a pixel or set of pixels. Next, because the cameras $C_A$ and $C_B$ are in the same place with respect the displays 302 and 304, shift vectors are determined to shift the captured images. For example, a shift vector associated with captured image 606 shifts the captured image 602 by the amount D in a direction 614 to produce shifted image 616, and a shift vector associated with captured image 604 shifts the captured image 604 by the same amount D in an opposite direction 618 to produce shifted image 620. The shifted images 616 and 620 may be mirrored and projected on the respective displays 304 and 302. As a result, the image of participant B's face intersects, or is aligned with, the line 612 connecting participant A's eyes to the lens of camera $C_A$, and the image of participant A's face intersects, or is aligned with, the line 610 connecting participant B's eyes to the lens of camera $C_B$.

In alternative embodiments, using the location of the each participant's face obtained from facial recognition, the shift vector can be determined by measuring the lateral or horizontal distances from the approximate center of each participant's face to the positions of their respective cameras. For example, as shown in FIG. 6, the cameras $C_A$ and $C_B$ are located behind, the centers of their respective displays 302 and 304. The lateral distance d from the approximate center of participant A's face to position 622 of the camera $C_A$ is determined, and the lateral distance d' from the approximate center of participant B's face to the position 624 of the camera $C_B$ is determined. When cameras $C_A$ and $C_B$ are in the same location with respect to the corresponding displays 302 and 304, the distance D is approximately equal to the sum of d and d' (i.e., $D \approx d+d'$).

Note that shifting the images as described in FIG. 6 creates a blank area 626 and collaboration area 628 in the image presented on the display 302 and a blank area 630 and a collaboration area 632 in the image presented on the display 304. The blank areas 626 and 632 are located farthest from the participant viewing the associated display. A blank area created as a result of shifting images as described above has two functions. First, a blank area serves to indicate to each participant the extent to which the collaboration area can be used for shared content. Second, dynamic coupling of the blank areas to the participants' shifts in position may induce the participants to move in such a manner as to maximize the collaboration areas.

In addition to providing perceived eye contact between participants, an additional important aspect of video-conferencing methods of the present invention is enabling communication of participant gaze and gestures with respect to shared content. For example, participant A can point at a part of the shared content and look to see whether participant B is following participant A's gesture, or concentrating on some other part of the display. As a result, when an image of a participant is shifted, as described above, the shared content is also shifted accordingly. Because a participant's image is ultimately projected onto the same display as the shared content, the amount by which the shared content is shifted is the same as the shift applied to the participant's image.

Figure 7A:
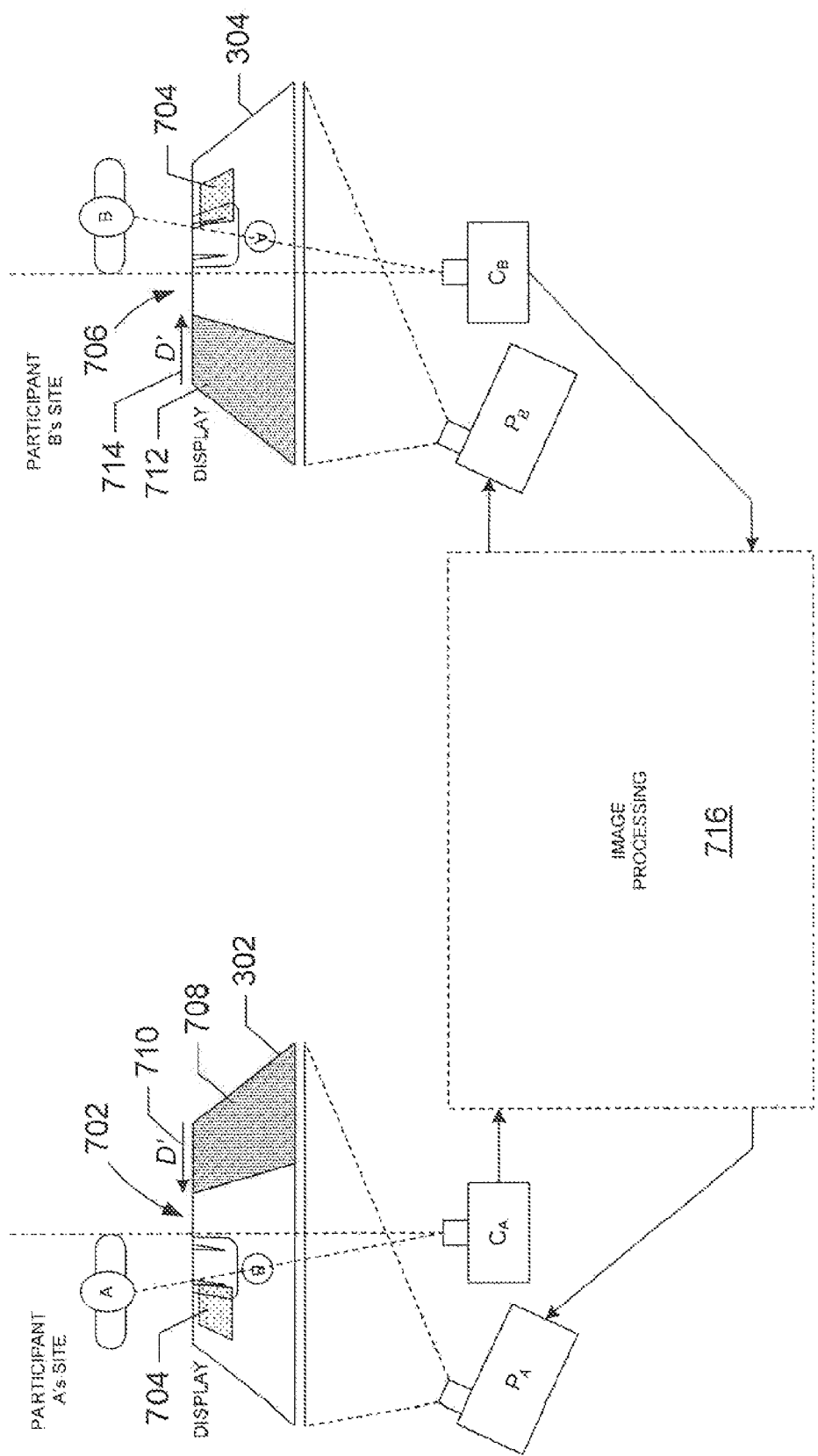
FIGS. 7A-7C show examples of shifting images and shared content to establish perceived eye contact between participants and accurate gaze awareness in accordance with one embodiment of the present invention.
Figure 7B:
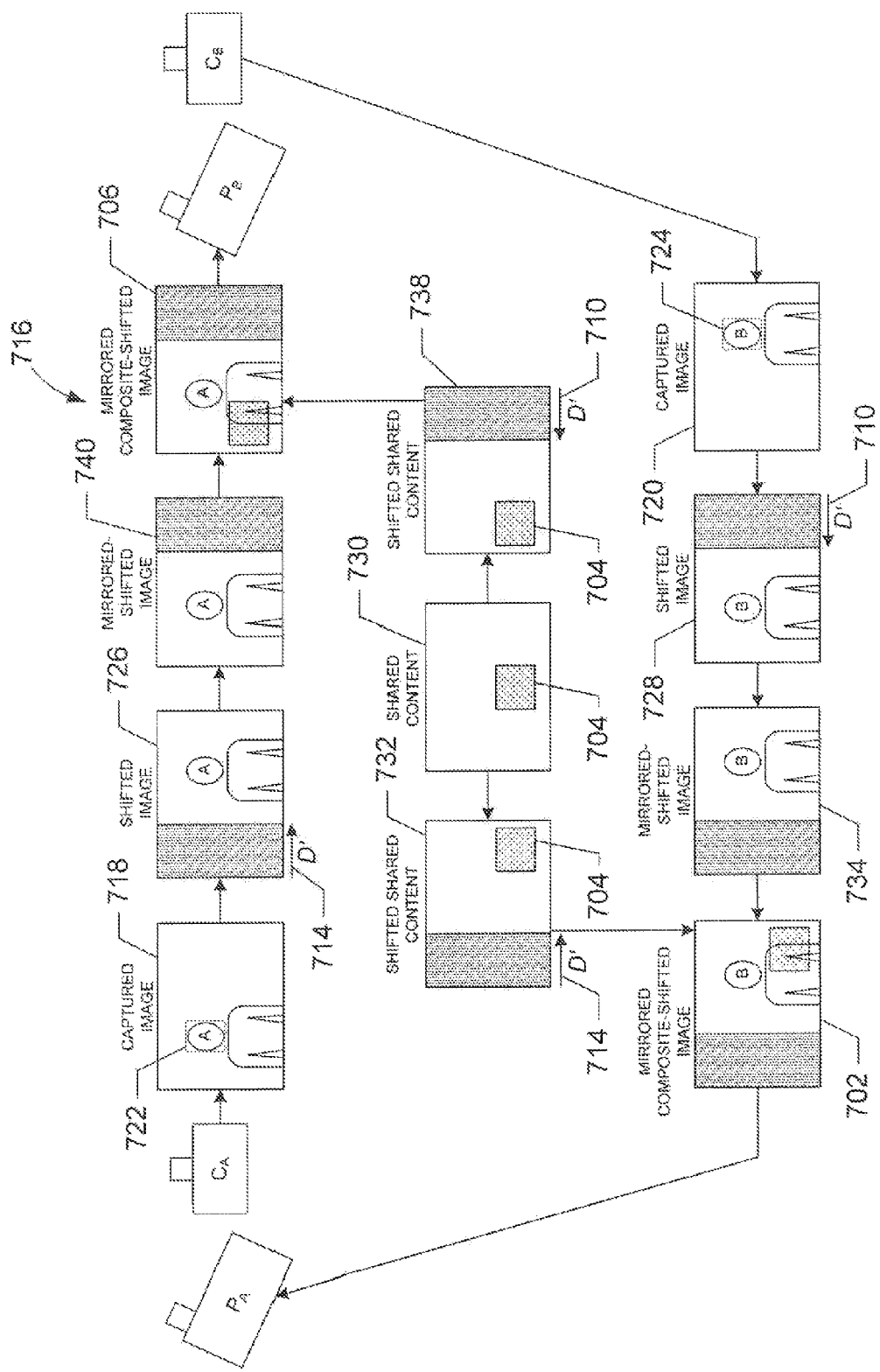

FIGS. 7A-7B show an example top-plan view of shifting images and shared content. In FIG. 7A, a mirrored composite-shifted image 702 of participant B and shared content 704 is presented on the display 302 for viewing by participant A, and a mirrored composite-shifted image 706 of participant A and the same shared content 704 is presented on the display 302 for viewing by participant B. The display 302 includes a blank area 708 corresponding to the image of participant B and the shared content 704 having been shifted in a direction by an amount D' represented by a first shift vector 710. The display 304 also includes a blank area 712 corresponding to the image of participant A and the shared content 704 having been shifted in an opposite direction by the same amount D' represented by a second shift vector 714. An example of image processing 716 used to obtain mirrored composite-shifted images 702 and 706 is now described as follows with reference to FIG. 7B. In FIG. 7B, captured images 718 and 720 of participants A and B, respectively, are obtained and facial recognition is used to identify the location of participants A and B's faces as indicated by boxes 722 and 724, respectively, as described above with reference to FIG. 6. The distance D' between the approximate center of the image of participant A's face 722 and the approximate center of the image of participant B's face 724 are determined and used to create the shift vectors 710 and 714 with opposite directions but with the same magnitude D', as described above with reference to FIG. 6. Shift vector 714 is applied to captured image 718 to produce a shifted image 726, and shift vector 710 is applied to captured image 720 to produce a shifted image 728. FIG. 7B also includes an image 730 of the shared content 704 presented on displays 302 and 304, shown in FIG. 7A. Cameras $C_A$ and $C_B$ do not capture images of the remote participant or of the shared content 704 due to the configuration of systems referenced in the incorporated patent applications identified above. In order to produce mirrored composite-shifted image 702, shown in FIG. 7A, the image 730 of shared content 704 is shifted by the shift vector 710 to produce a first shifted shared-content image 732. The shifted image 728 is mirrored to produce mirrored shifted image 734, which is composited with the shifted shared content image 732 to produce the mirrored composite-shifted image 702 that is projected on the display 302, as shown in FIG. 7A. On the other hand, in order to produce mirrored composite-shifted image 706, also shown in FIG. 7A, the image 730 of shared content 704 is shifted by the shift vector 714 to produce a second shifted shared-content image 738. The shifted image 726 is mirrored to produce mirrored shifted image 740 and composited with shifted shared-content image 738 to produce the mirrored composite-shifted image 706 that is projected on the display 304, as shown in FIG. 7A.

Figure 7C:
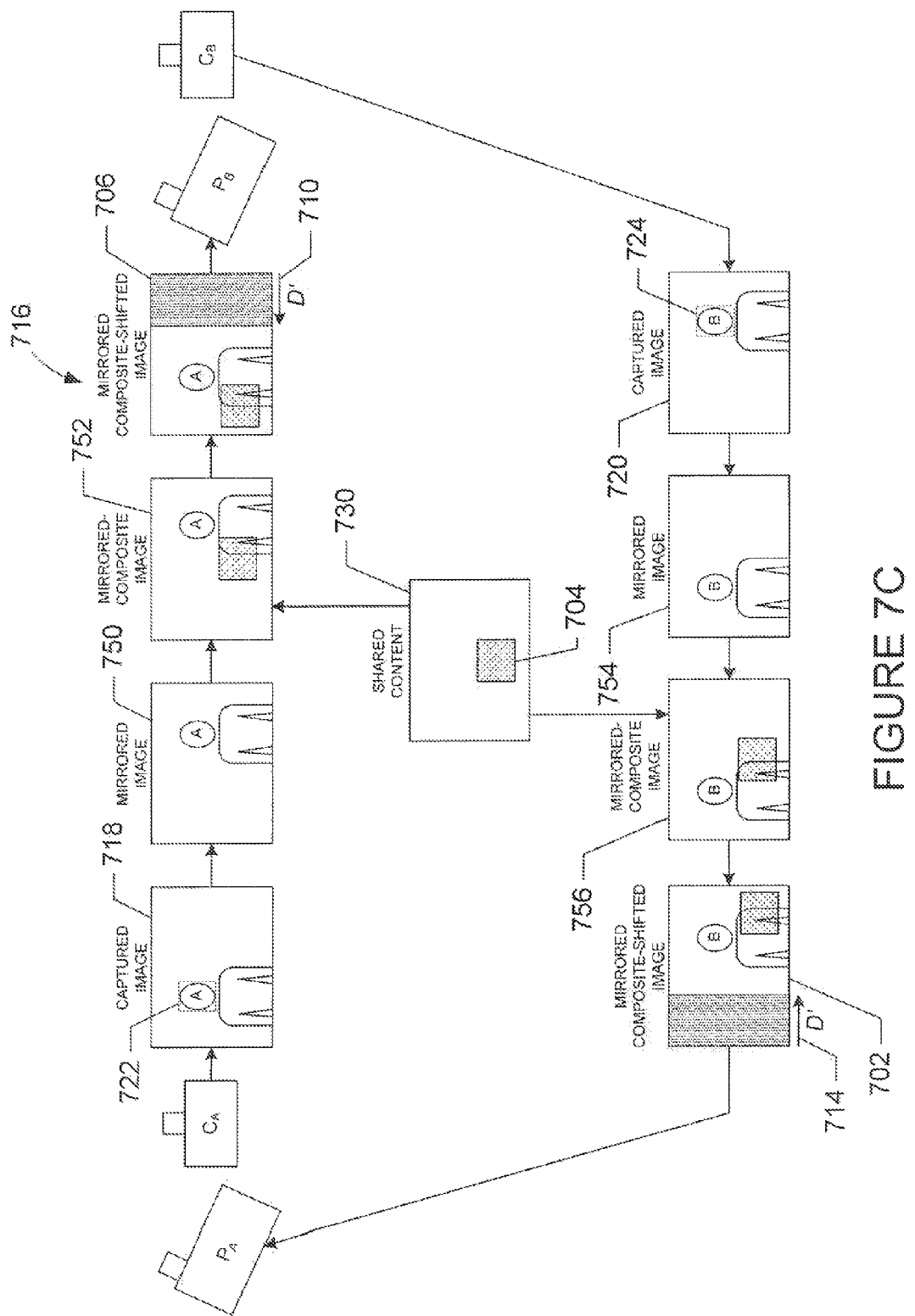

FIG. 7C shows an alternative method for producing mirrored composite-shifted images 702 and 706 without shifting the image 730 of shared content 704. In FIG. 7C, the captured image 718 is mirrored to produce mirrored image 750, which is composited with image 730 to produce mirrored-composite image 752. Mirrored composite image 752 is then shifted by the shift vector 710 to produce mirrored composite-shifted image 706. Likewise, the captured image 720 is mirrored to produce mirrored image 754, which is composited with image 730 to produce mirrored-composite image 756. Mirrored composite image 756 is then shifted by the shift vector 714 to produce mirrored composite-shifted image 702.

Embodiments of the present invention are not limited to the length of the shift vector applied to the shared content image having the same length as the shift vector applied to the captured images of the participants. In other embodiments, the length of shift vector applied to the shared content can be selected to create motion parallax. For example, in FIG. 7B, the length of the shift vector applied to the image 730 of the shared content 704 can be a fraction of the length D'. Shifting the image 730 in this manner creates the effect that as a participant viewing the display moves their head, the image of the participant presented on the display appears to move more than the shared content, providing a sense of depth through motion parallax. In other words, the shared content 704 appears to be closer than the participant presented on the display.

Figure 8:
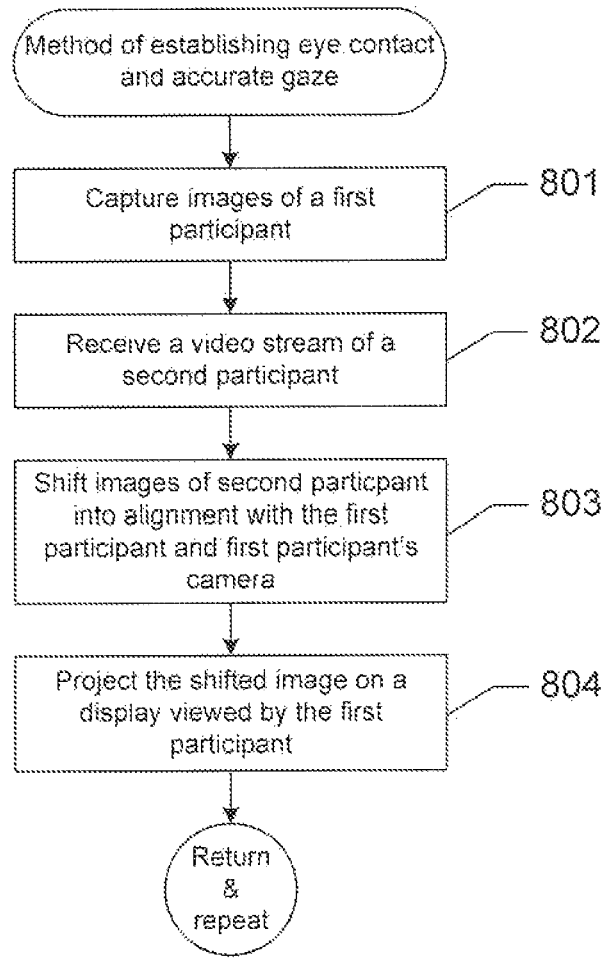
FIG. 8 shows a flow diagram summarizing a method of establishing perceived eye contact between participants engaged in a video conference in accordance with one embodiment of the present invention.

FIG. 8 shows a flow diagram summarizing a method of establishing perceived eye contact between a first participant and a second participant engaged in a video conference. In step 801, images of the first participant are captured through a display using a camera. The display is located between the first participant and the camera, as described above with reference to FIGS. 2-7. In step 802, a video stream encoding images of the second participant located at a remote site are received, as described above with reference to FIGS. 2-7. In step 803, the images of the second participant are shifted so that the images of the second participant's face are approximately aligned with the eyes of the first participant and the lens of the camera (803), as described above with reference to FIGS. 6 and 7. In step 804, the shifted image is projected on the display using a projector with the image of the second participant's face approximately aligned with the eyes of the first participant and the lens of the camera, as described above with reference to FIGS. 2-7.

Figure 9:
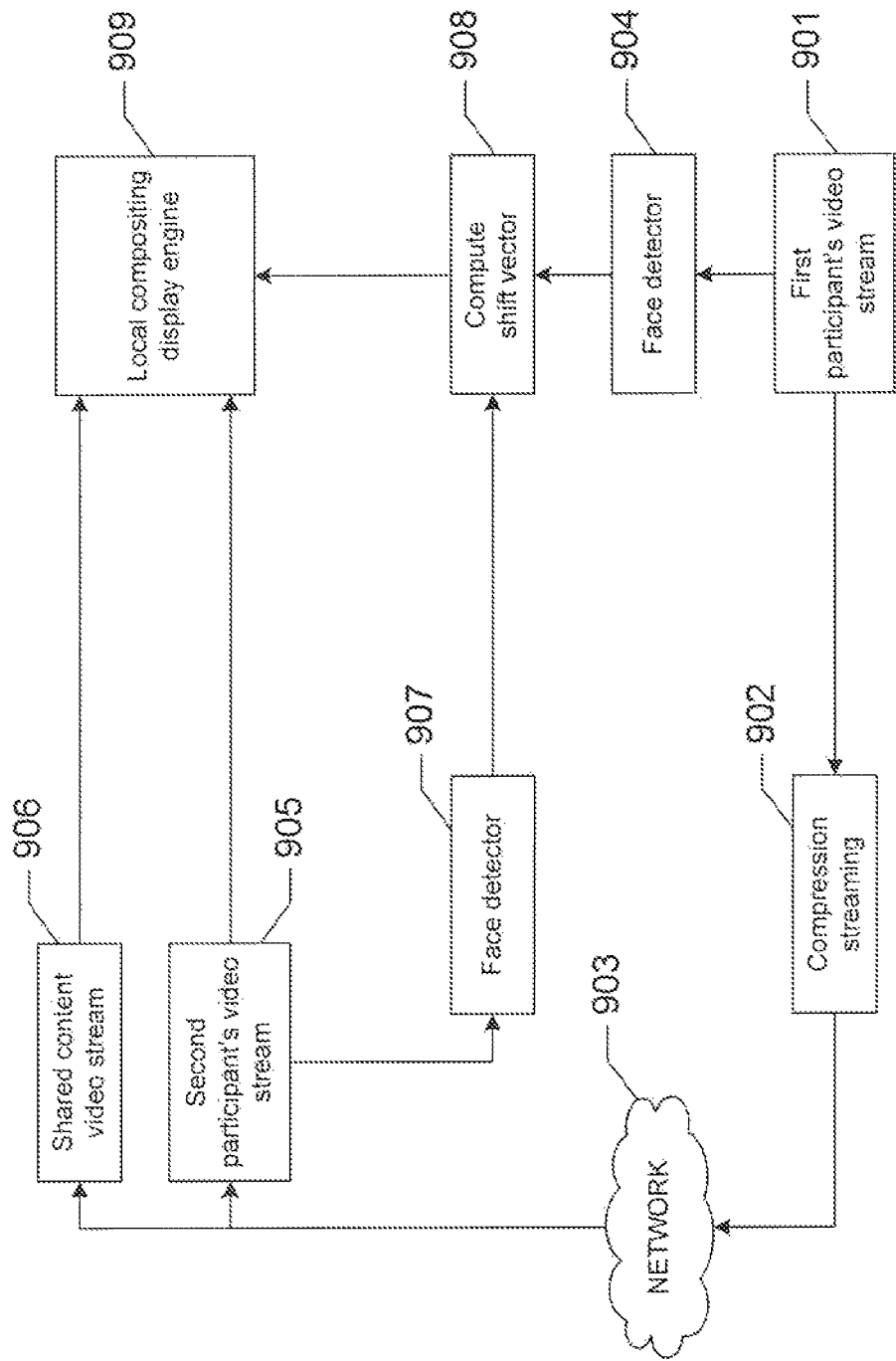
FIG. 9 shows a real-time processing pipeline diagram for establishing perceived eye contact between participants engaged in a video conference in accordance with one embodiment of the present invention.

FIG. 9 shows a real-time processing pipeline diagram for establishing perceived eye contact between a first participant and a second participant engaged in a video conference. In step 901, the first participant generates a video stream encoding images of the first participant through a display, as described above with reference to FIGS. 2-7. In step 902, the video stream is compressed and set to the second participant over a network 903, such as the Internet or a local area network. In step 904, the images encoded in the video stream produced by the first participant are processed using a face detector in order to identify the location of the first participant's face in the images, as described above with reference to FIG. 6. While the video stream associated with the first participant is being generated, a video stream encoding images of the second participant's is received in step 905 from the network and a video stream encoding any shared media also is received in step 906 from the network. In step 907, the images encoded in the video stream produced by the second participant are processed using a face detector in order to identify the location of the second participant's face is the images, as described above with reference to FIG. 6. In step 908, a shift vector is computed based on the face detection results of steps 907 and 908, as described above with reference to FIG. 7. In step 909, the images of the second participant are shifted, mirrored, and composited with shifted images of the shared content, as described above with reference to FIGS. 6 and 7. Alternatively, step 907 can be omitted by transmitting the location of the first participant's face in the images along with the video stream in step 902 over the network 903.

Methods of establishing eye contact between participants in a video conference are described above with reference to a computing device. The computing device can be a desktop computer, a laptop, or any other suitable device configured to carry out video and image processing. However, embodiments of the present invention are not so limited. In other embodiments, the video processing performed by the computing devices described above may also be performed by a projector or the video processing can be performed by a camera.

Figure 10:
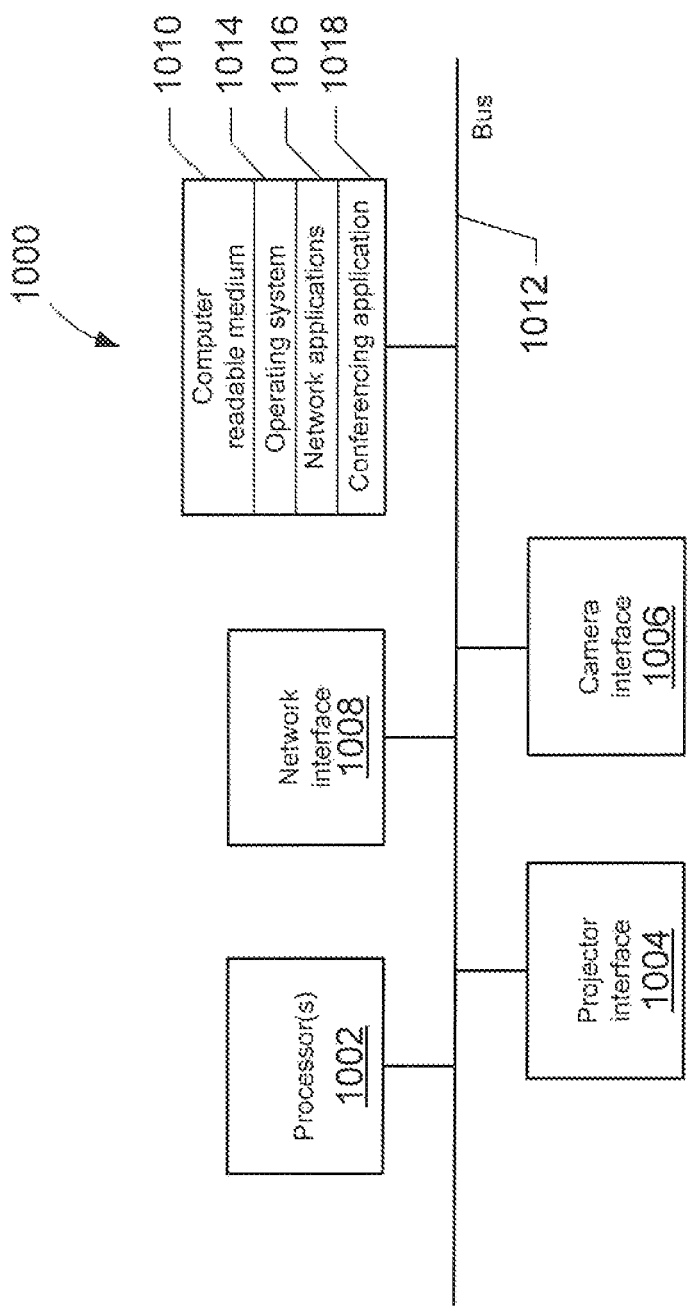
FIG. 10 shows a schematic representation of a computing device in accordance with one embodiment of the present invention.

FIG. 10 shows a schematic representation of a computing device 1000. The device 1000 may include one or more processors 1002, such as a central processing unit; a projector interface 1004; a video or camera interface 1006; one or more network interfaces 1008, such as a Local Area Network LAN, a wireless 802.11x LAN, a 3G mobile WAN or a WiMax WAN; and one or more computer-readable mediums 1010. Each of these components is operatively coupled to one or more buses 1012. For example, the bus 1012 can be an EISA, a PCI, a USB, a FireWire, a NuBus, or a PDS.

The computer readable medium 1010 can be any suitable medium that participates in providing instructions to the processor 1002 for execution. For example, the computer readable medium 1010 can be non-volatile media, such as firmware, an optical disk, a magnetic disk, or a magnetic disk drive; volatile media, such as memory; and transmission media, such as coaxial cables, copper wire, and fiber optics. The computer readable medium 1010 can also store other software applications, including word processors, browsers, email, Instant Messaging, media players, and telephony software.

The computer-readable medium 1010 may also store an operating system 1014, such as Mac OS, MS Windows, Unix, or Linux; network applications 1016; and a video-conferencing application 1018. The operating system 1014 can be multi-user, multiprocessing, multitasking, multithreading, real-time and the like. The operating system 1014 can also perform basic tasks such as recognizing input from input devices, such as a keyboard, a keypad, or a mouse; sending output to a projector and a camera; keeping track of files and directories on medium 1010; controlling peripheral devices, such as disk drives, printers, image capture device; and managing traffic on the one or more buses 1012. The network applications 1016 includes various components for establishing and maintaining network connections, such as software for implementing communication protocols including TCP/IP, HTTP, Ethernet, USB, and Fire Wire.

The video-conference application 1018 provides various software components for established eye contact between video conference participants, as described above. In certain embodiments, some or all of the processes performed by the application 1018 can be integrated, into the operating system 1014. In certain embodiments, the processes can be at least partially implemented in digital electronic circuitry, or in computer hardware, firmware, software, or in any combination thereof.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method of establishing perceived eye contact between a first participant and a second participant engaged in a video conference using a computing device, the method comprising:
 capturing images of the first participant through a display using a camera, the display located between the first participant and the camera;
 receiving a video stream of images of the second participant;
 shifting the images of the second participant in accordance with a shift or, wherein the shift vector places the images of the second participants face in approximate alignment with the eyes of the first participant and the lens of the camera; and
 projecting the shifted images on the display using a projector.

2. The method of claim 1, wherein shifting the images of the second participant in accordance with the shift vector further comprises:
 determining a first lateral distance between the first participants face and the position of the camera;
 determining a second lateral distance between the second participant's face and the position of a camera located at the second participants site; and
 summing the first distance and the second distance to obtain a distance corresponding to the length of the shift vector.

3. The method of claim 1, wherein shifting the images of the second participant in accordance with the shift vector further comprises:
 identifying a first coordinate pixel location associated with the first participant's face in the images captured with the camera;
 identifying a second coordinate pixel location associated with the second participant's face in the images encoded in the video stream; and
 computing a distance between the first coordinate pixel location and the second coordinate pixel location wherein the distance between the first and second coordinate pixel locations corresponds to the length of the shift vector.

4. The method of claim 1, herein shifting the images of the second participant further comprises mirroring the image of the second participant followed by shifting the mirrored image of the second participant in accordance with the shift vector.

5. The method of claim 1, wherein shifting the images of the second participant further comprises mirroring the shifted image of the second participant.

6. The method of claim 1 further comprises:
 generating an image of shared content for presenting on the display;
 shifting the image of shared content; and
 compositing the shifted image of shared content with the shifted image of the second participant.

7. The method of claim 1 further comprises
 generating an image of shared contents for presenting on the display;
 mirroring the image of the second participant; and
 compositing the image of the shared content with the mirrored image of the second participant.

8. The method of claim 1, wherein shifting the images of the second participant further comprises creating a blank space in the image of the second participant presented on the display.

9. A non-transitory computer readable medium having instructions encoded thereon for establishing perceived eye contact between a first participant and a second participant engaged in a video conference, the instructions enabling one or more processors to perform the operations of:
   capturing images of the first participant through a display using a camera, the display located between the first participant and the camera;
   receiving a video stream of images of the second participant;
   shifting the images of the second participant in accordance with a shift vector, wherein the shift vector places the images of the second participant's face in approximate alignment with the eyes of the first participant and the lens of the camera; and
   projecting the shifted images on the display using a project.

10. The medium of claim 9, wherein shifting the images of the second participant accordance with the shift vector further comprises:
   determining a first lateral distance between the first participant's face and the position of the camera;
   determining a second lateral distance between the second participants face and the position of a camera located at the second participant's site; and
   summing the first distance and the second distance to obtain a distance corresponding to the length of the shift vector.

11. The medium of claim 9, wherein shifting the images of the second participant in accordance with the shift vector further comprises:
   identifying a first coordinate pixel location associated with the first participant's face in the images captured with the camera;
   identifying a second coordinate pixel location associated with the second participant's face in the images encoded in the video stream; and
   computing a distance between the first coordinate pixel location and the second coordinate pixel location wherein the distance between the first and second coordinate pixel locations corresponds to the length of the shift vector.

12. The medium of claim 9, wherein shifting the images of the second participant further comprises one of:
   mirroring the shifted image of the second participant followed by shifting the mirrored image of the second participant in accordance with the shift vector; and
   mirroring the shifted image of the second participant.

13. The medium of claim 9, wherein shifting the images of the second participant further comprises mirroring the shifted image of the second participant.

14. The medium of claim 9 further comprises:
   generating an image of shared content for presenting on the display;
   shifting the image of shared content; and
   compositing the shifted image of shared content with the shifted image of the second participant.

15. The medium of claim 9 further comprises:
   generating an image of shared content for presenting on the display;
   mirroring the image of the second participant; and
   compositing the image of the shared content with the mirrored image of the second participant.

* * * * *

UNITED STATES PATENT AND TRADEMARK OFFICE
CERTIFICATE OF CORRECTION

| | | |
|---|---|---|
| PATENT NO. | : 8,908,008 B2 | Page 1 of 1 |
| APPLICATION NO. | : 13/806531 | |
| DATED | : December 9, 2014 | |
| INVENTOR(S) | : Kar-Han Tan et al. | |

It is certified that error appears in the above-identified patent and that said Letters Patent is hereby corrected as shown below:

In the Claims,

In column 10, line 12 approx., in Claim 1, delete "or," and insert -- vector, --, therefor.

In column 10, line 13 approx., in Claim 1, delete "participants" and insert -- participant's --, therefor.

In column 10, lines 22-23 approx., in Claim 2, delete "participants" and insert -- participant's --, therefor.

In column 10, line 26, in Claim 2, delete "participants" and insert -- participant's --, therefor.

In column 10, line 40, in Claim 3, delete "location" and insert -- location, --, therefor.

In column 10, line 44, in Claim 4, delete "herein" and insert -- wherein --, therefor.

In column 10, line 58, in Claim 7, delete "comprises" and insert -- comprises: --, therefor.

In column 10, line 59, in Claim 7, delete "contents" and insert -- content --, therefor.

In column 12, line 5, in Claim 11, delete "location" and insert -- location, --, therefor.

Signed and Sealed this
Twenty-third Day of June, 2015

Michelle K. Lee
*Director of the United States Patent and Trademark Office*